(12) United States Patent
Kralevich, Jr. et al.

(10) Patent No.: US 6,242,550 B1
(45) Date of Patent: Jun. 5, 2001

(54) POLYMERIC DIMETHYL-DICYCLOPENTADIENE/LIMONENE RESIN

(75) Inventors: Mark Leslie Kralevich, Jr., Copley; Edward John Blok, Wadsworth; Lawson Gibson Wideman, Hudson; Paul Harry Sandstrom, Tallmadge; Joseph Miles Ruscak, Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/307,536

(22) Filed: May 7, 1999

(51) Int. Cl.⁷ .................................................. C08F 136/00
(52) U.S. Cl. ...................... 526/283; 526/290; 526/308; 526/335
(58) Field of Search .................. 526/283, 290, 526/308, 335

(56) References Cited

U.S. PATENT DOCUMENTS

| | | | |
|---|---|---|---|
| 3,466,267 | 9/1969 | Derfer | 260/80.7 |
| 3,634,374 | 1/1972 | Bell | 260/87.5 |
| 3,903,061 * | 9/1975 | Cesca et al. | 260/80.78 |
| 3,927,144 | 12/1975 | Hayashi et al. | 260/888 |
| 3,981,958 | 9/1976 | Nakashima et al. | 260/878 |
| 4,038,346 | 7/1977 | Feeney | 260/887 |
| 4,068,062 | 1/1978 | Lepert | 526/76 |
| 4,102,834 | 7/1978 | Morimoto et al. | 260/4 |
| 4,157,363 | 6/1979 | Hepworth | 260/889 |
| 4,687,794 | 8/1987 | Huddleston et al. | 523/351 |
| 4,739,036 | 4/1988 | Colvin et al. | 528/389 |
| 4,740,559 | 4/1988 | Johansson et al. | 525/185 |
| 4,752,507 | 6/1988 | Johansson et al. | 427/385.5 |
| 4,824,921 | 4/1989 | Luvinh | 526/237 |
| 4,889,891 * | 12/1989 | Durairaj et al. | 525/139 |
| 4,968,764 | 11/1990 | Hayashida et al. | 526/283 |
| 5,049,625 * | 9/1991 | Tazuma et al. | 525/391 |
| 5,691,432 | 11/1997 | Williams | 526/283 |

FOREIGN PATENT DOCUMENTS

| | | | |
|---|---|---|---|
| 0011393 | 5/1980 | (EP) | C08F/240/00 |
| 0063092 | 4/1982 | (EP) | C08L/21/00 |
| 0249904 | 6/1987 | (EP) | C08F/240/00 |
| 1107329 | 3/1968 | (GB) | C08F/19/00 |

OTHER PUBLICATIONS

Chemical Abstracts, vol. 90, 56115s (1979).
European Search Report.

* cited by examiner

Primary Examiner—Helen L. Pezzuto
(74) Attorney, Agent, or Firm—Bruce J. Hendricks

(57) ABSTRACT

This invention relates to a novel class of polymeric resins which have a softening point ranging from about 50° C. to about 220° C. and a molecular weight ranging from about 500 to about 42,000. The resins comprise the polymers which result from the polymerization reaction between dimethyl dicyclopentadiene and limonene. The polymeric resins are particularly useful in improving traction of the rubber when used in tire treads.

8 Claims, No Drawings

POLYMERIC DIMETHYL-DICYCLOPENTADIENE/LIMONENE RESIN

BACKGROUND OF THE INVENTION

This invention relates to a polymeric resin which is the reaction product of the polymerization reaction between dimethyl-dicyclopentadiene and limonene. Use of the polymeric resins of the present invention in a rubber tire stock improves the traction and handling of the tire.

SUMMARY OF THE INVENTION

The present invention relates to a polymeric dimethyl-dicyclopentadiene/limonene resin. The polymeric resins of the present invention have softening points ranging from about 50° C. to about 220° C., and a molecular weight of from about 500 to about 42,000. The present invention also includes a blend of dimethyl-dicyclopentadiene/limonene resins and rubber stocks containing the dimethyl-dicyclopentadiene/limonene resin.

DETAILED DESCRIPTION OF THE INVENTION

The present invention relates to a polymeric resin comprising the reaction product of the polymerization reaction between dimethyl-dicyclopentadiene and limonene and having a softening point ranging from about 50° C. to about 220° C. and a molecular weight ranging from about 500 to about 42,000.

In addition, the present invention relates to a resin composition comprising a blend of two or more polymeric resins wherein each resin comprises the reaction product of the polymerization reaction between dimethyl-dicyclopentadiene and limonene. Alternatively, the blend can be formed in-situ; that is, the reaction temperature may be raised during the polymerization to increase the molecular weight distribution and broaden the softening point.

In addition, there is disclosed a pneumatic tire having a tread comprised of a rubber stock comprising (1) a rubber selected from the group consisting of natural rubber, rubber derived from a diene monomer or mixtures thereof, and (2) a polymeric resin composition which is the reaction product of the polymerization reaction between dimethyl-dicyclopentadiene and limonene; said resin having a softening point ranging from about 50 to about 220° C. and a molecular weight ranging from about 500 to about 42,000.

There is also disclosed a rubber stock comprising (1) a rubber selected from the group consisting of natural rubber, rubber derived from a diene monomer or mixtures thereof, and (2) a polymeric resin composition which is the reaction product of the polymerization reaction between dimethyl-dicyclopentadiene and limonene; said resin having a softening point ranging from about 50 to about 220° C. and a molecular weight ranging from about 500 to about 42,000.

The terms "polymeric compound" and "polymer" when used to describe the resins of the present invention are intended to only include those molecules which contain a monomeric unit derived from dimethyl-dicyclopentadiene and limonene and where at least one of the monomeric units derived from the dimethyl-dicyclopentadiene or limonene is repeated. Therefore, the compounds formed by the reaction of a single dimethyl-dicyclopentadiene molecule and a single limonene are not polymeric as the term is used herein. The term monomeric unit means a structure that occurs in a polymeric compound and which differs from the structure of dimethyl-dicyclopentadiene or limonene due to changes resulting from molecular reorientation during the linking to the adjacent structure. These changes may include addition to a double bond or the addition or removal of a hydrogen atom from the dimethyl-dicyclopentadiene or limonene.

The weight ratio of the dimethyl-dicyclopentadiene to limonene in the polymerization reaction may vary, depending on the desired properties of the final polymeric product. For example, the weight ratio of the dimethyl-dicyclopentadiene to limonene as starting material may range from about 1:10 to about 10:1. The preferred weight ratio of dimethyl-dicyclopentadiene to limonene may range from about 5:1 to 1:5 as starting material. The most preferred ratio ranges from about 2:1 to 1:2. As to the final product, the weight ratio of polymeric units derived from the dimethyl-dicyclopentadiene to limonene may range from about 8:1 to 1:8. The preferred weight ratio of dimethyl-dicyclopentadiene to limonene in the final product ranges from about 1:3 to 3:1 with a range of from about 2.1:1 to 1:2.1, being particularly preferred.

The polymeric resinous material for use in the present invention comprises from 5 to 95 weight percent of units derived from dimethyl-dicyclopentadiene and from 95 to 5 weight percent of units derived from limonene. Preferably, the resin comprises from 33 to 67 weight percent of units derived from dimethyl-dicyclopentadiene and from 67 to 33 weight percent of units derived from limonene.

The polymeric resins may optionally be modified by the addition of up to 25 weight percent of units derived from hydrocarbons selected from $C_9$ and $C_{10}$ olefins and mixtures thereof. Therefore, at a minimum, no less than 75 weight percent of the units are derived from dimethyl-dicyclopentadiene and limonene. Preferably, from 5 to 10 weight percent of the units of the polymeric resin is derived from the above hydrocarbons.

The polymerization reaction between the dimethyl-dicyclopentadiene and the limonene may be a thermal (no catalyst) polymerization, or catalyzed, i.e., conducted in the presence of an acid catalyst. Examples of acid catalysts that may be used include Bronsted acid and Lewis acid-type catalysts. Such known acid catalysts include $H_2SO_4$, HCl, $H_3PO_4$; metal halides such as $BF_3$, $BCl_3$, $AlCl_3$, $AlBr_3$, $SnCl_4$, $ZnCl_2$, $SbCl_3$ and their etherates. The choice of a particular catalyst is dependent upon factors including the melting or boiling points of the reactants, desired rate of reaction, solvent, and pressure and temperature limitation of the production equipment, etc. When higher yields are desired, the metal halides or their etherates may be utilized. The preferred acid catalysts are $BF_3$ and $AlCl_3$. The most preferred catalyst is $AlCl_3$.

In the catalyzed polymerization process, the amount of catalyst may range from about 0.1 to about 20 weight percent of catalyst based on the total weight of reactants to be polymerized. Preferably, a range of from about 3 to about 5 weight percent of catalyst is preferred. The optimum concentration of catalyst depends on the nature of the solvent, if any, which effects the solubility of the catalyst as well as on the stirring efficiency inside the polymerization reactor.

The polymerization reaction may be carried out neat (without solvent) at or above the melting points of the reactants, or can be carried out in the presence of a solvent. The solvent may be an aliphatic $C_6$–$C_{12}$ hydrocarbon, an aromatic or haloaromatic ($C_6$–$C_9$) hydrocarbon, or a $C_6$–$C_9$ aliphatic halohydrocarbon. Examples of suitable solvents include hexane, heptane, cyclohexane, benzene, toluene, xylene, and chlorobenzene. The preferred solvents are heptane and cyclohexane.

The polymerization reaction may be conducted under a variety of operating conditions. The reaction pressure may vary and range from about one atmosphere to about 100 atmospheres with a pressure of from about two atmospheres to about ten atmospheres being preferred. The reaction temperature may range from about 0 to 100° C. with a preferred range being from about 25 to 50° C.

Depending on the reactivity of the reactants, amount of catalyst, reaction pressure and reaction temperature, the reaction time may vary. Generally speaking, the reaction time varies from about 1 to about 8 hours.

The molecular weight distribution of the polymeric resin of the present invention may range from about 500 to about 42,000. In a particularly preferred embodiment of the present invention, the resin composition may have a molecular weight distribution of from 500 to 29,500. The resin may comprise a blend of two or more individual polymeric resins each one of which is the reaction product of a polymerization reaction between dimethyl-dicyclopentadiene and limonene. Each individual polymeric resin preferably differs from the other by having a different molecular weight range. Generally speaking, all of the polymeric resins will exhibit some lower molecular weight values, however, not all of the individual resins may include the higher molecular values. In the alternative, all of the resins may have distributions that vary by their lower molecular values with the high molecular weight value relatively being the same. For example, when the resin blend comprises three individual polymeric resins, the first resin may have a molecular weight ranging from about 700 to about 24,000, the second resin may have a molecular weight ranging from about 700 to about 36,000, and the third resin may have a molecular weight ranging from about 700 to about 42,000.

In accordance to another embodiment of the present invention, the resin composition may comprise a blend of four individual resins. In accordance with this embodiment, the first resin may have a molecular weight ranging from about 500 to about 15,000, the second resin may have a molecular weight ranging from about 700 to about 15,000, the third resin may have a molecular weight ranging from about 3,000 to about 15,000, and the fourth resin may have a molecular weight ranging from about 4,000 to about 15,000.

The blend may be formed in-situ or mechanically blended.

The resin composition of the present invention has a softening point ranging from about 50 to about 220° C. For the purposes of the present invention, the term "softening point" is used to describe the temperature range from when wetting occurs in a capillary melting point tube to where the resin is completely liquid. Representative of suitable equipment to determine the relative softening point is a Thomas-Hoover Melting Point apparatus equipped with a silicon oil bath.

Rubber stocks containing natural rubber or rubbers derived from a diene monomer may be modified with the resin compositions of the present invention. Examples of rubbers derived from a diene monomer include substituted and unsubstituted, saturated and unsaturated, synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) when the monomers are combined in the random distribution or block form. In addition to the diene monomers, other monomers may be used. Of all the monomers that may be used, the monomers may be substituted or unsubstituted and may possess one or more double bonds, for example, diene monomers, both conjugated and nonconjugated, and monoolefins, including cyclic and acyclic monoolefins, especially vinyl and vinylidene monomers. Examples of conjugated dienes are 1,3-butadiene, isoprene, chloroprene, 2-ethyl-1,3-butadiene and 2,3-dimethyl-1,3-butadiene. Examples of nonconjugated dienes are 1,4-pentadiene, 1,4-hexadiene, 1,5-hexadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene, homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The rubber compounds which may be modified by the resins of the present invention are preferably cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene, copolymers of styrene and isoprene and blends thereof.

The amount of polymeric resins that may be used with the diene containing polymers may vary and depend on the polymer to be modified, the particular polymeric resin, the desired degree of modification and the like. Generally speaking, the polymeric resin is used in amounts ranging from about 5 to about 50 parts per hundred (phr) of diene polymer. Preferably, the polymeric resin is used in amounts of from about 5 to about 25 phr, with a range of from about 10 to about 25 phr being particularly preferred.

The polymeric resins may be incorporated in the diene containing polymer by conventional mixing procedures, for example, by adding them in a banbury mixer or by adding them to the rubber on a mill. Preferably, when the polymeric resins have higher molecular weights, it is recommended that they be ground to a fine powder to insure adequate dispersion. Such powders may be treated to suppress dust, for example, by the addition of oil, or they can be mixed with a binder, for example, a polymer latex, and granules or pellets containing up to 5 percent by weight of a binder. They can also be formulated as pre-dispersions or master-batched in a diene rubber stock, which pre-dispersions may contain, for example, from 15 to 50 percent by weight of the polymeric resin.

Similar to vulcanizing conventional rubber stocks, the rubber stocks containing the polymeric resins need a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking, the amount of sulfur vulcanizing agent ranges from about 0.1 to about 8 phr with a range of from about 1.5 to about 6 being preferred.

Conventional rubber additives may be incorporated in the rubber stock of the present invention. The presence of a sulfur vulcanizing agent and conventional additives are not considered to be an aspect of this invention. The additives commonly used in rubber stocks include fillers, plasticizers, curatives, processing oils, retarders, antiozonants, antioxidants and the like. The total amount of filler that may be used may range from about 45 to about 130 phr being preferred. Fillers include silicas, clays, calcium carbonate, calcium silicate, titanium dioxide and carbon black. Preferably, at least a portion of the filler is carbon black. Plasticizers, oils or mixtures thereof are conventionally used in amounts ranging from about 2 to about 90 phr with a range of about 5 to about 70 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products, cumarone-indene resins and esters such as dibutylphthalate and tricresyl phosphate. Examples of oils are commonly known as highly aromatic process oil, process soybean oil and highly paraffinic process oil. Materials used in compounding which function as an accelerator-activator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

Accelerators may be used to control the time and/or temperature required for vulcanization of the rubber stock. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, paraphenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The mixing of the rubber composition can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and polymeric resin are mixed in one or more non-productive mix stages. The terms "non-productive" and "productive" mix stages are well known to those having skill in the rubber mixing art.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The following examples are presented in order to illustrate but not limit the present invention.

In the following examples, the Flexsys Rubber Process Analyzer (RPA) 2000 was used to determine dynamic mechanical Theological properties. The curing conditions were 160° C., 1.667 Hz, 15.8 minutes and 0.7 percent strain. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

The compounded rubber sample is placed on the bottom die. When the dies are brought together, the sample is in a pressurized cavity where it will be subjected to a sinusoidal oscillating shearing action of the bottom die. A torque transducer connected to the upper die measures the amount of torque transmitted through the sample as a result of the oscillations. Torque is translated into the shear modulus, G, by correcting for the die form factor and the strain. The RPA 2000 is capable of testing uncured or cured rubber with a high degree of repeatability and reproducibility. The tests and subtests available include frequency sweeps at constant temperature and strain, curing at constant temperature and frequency, strain sweeps at constant temperature and frequency and temperature sweeps at constant strain and frequency. The accuracy and precision of the instrument allows reproducible detection of changes in the compounded sample.

The values reported for the storage modulus, (G'), loss compliance (J") and tan delta are obtained from a strain sweep at 100° C. and 1 Hz following the cure test. These properties represent the viscoelastic response of a test sample to shear deformation at a constant temperature and frequency.

The following examples are presented for the purposes of illustrating and not limiting the present invention. All parts are parts by weight unless specifically identified otherwise.

EXAMPLE 1

A three liter round bottom flask was fitted with a mechanical stirrer, a constant temperature water bath, a thermocouple and a dropping funnel. The flask was swept with nitrogen and charged with 200 milliliters of cyclohexane containing 50 grams of anhydrous aluminum chloride. Stirring was started and the water bath raised the temperature of the aluminum chloride/cyclohexane suspension to 30° C. The dropping funnel was charged with a solution of 200 ml of cyclohexane, 200 grams of dimethyl-dicyclopentadiene and 200 grams of (+)-limonene of technical grade from Eastman Kodak. The feed stream was added as quickly as possible with the reaction temperature maintained at 25–30° C. After about 35–40 minutes, all of the feed had been added and the reaction temperature of 25–30° C. was maintained for a total residence time of two hours with stirring. A solution of 4 liters of isopropanol and 2 liters of water was treated with the reaction mixture. The aqueous-organic mixture was stirred vigorously until all of the catalyst had been hydrolyzed. The organic layer which contains a suspended solid was separated and washed with two portions of 2 liters of water. The organic layer which contained the suspended solid was dried in a drying oven at 70° C. and 29 inches of mercury vacuum. The product softens or shows wetting in a capillary melting point tube at 142–163° C. Small molecule GPC analysis gives a molecular weight distribution of 6.5 percent in the 29,500 MW range, 22.9 percent in the 15,600 MW range and 41.8 percent in the 4100 MW range and 26.2 percent in the 1610 MW range and 2.6 percent in the 430 MW range.

EXAMPLE 2

In this example, the resin prepared in accordance with Example 1 was evaluated in a rubber compound.

Rubber compositions containing the materials set out in Table I were prepared in a BR Banbury™ mixer using two separate stages of addition (mixing); namely, one non-productive mix stage and one productive mix stage. The non-productive stage was mixed for 3.5 minutes or to a rubber temperature of 160° C., whichever occurred first. The mixing time for the productive stage was to a rubber temperature of 120° C.

The rubber compositions are identified herein as Samples 1 and 2. Sample 1 is considered herein as a control without the use of the resin used in the present invention being added to the rubber composition. Sample 1 contains a commercially available aromatic resin. Sample 2 contains the resin prepared in Example 1.

The samples were cured at about 150° C. for about 28 minutes.

Table II illustrates the behavior and physical properties of the cured Samples 1 and 2.

The Dimethyl DCPD/Limonene resin of Example 1 in Sample 2 imparts a durability advantage with equal dry traction over the Coumarone Indene control (Sample 1). More cornering stiffness and better handling is provided due to the significant increase in 300 percent modulus and dynamic modulus (G') at 40 percent strain. Room Temperature Tensile Strength, 100C Tensile Strength and Energy to Break at 100C are maintained or increased which will improve the graining and blistering resistance of the tread. The loss compliance (J") and tan delta at 40 percent strain were maintained or improved which indicates equal or improved traction. This resin improves the tradeoff between traction and durability that is present with conventional materials.

TABLE I

| Samples | Ctrl 1 | 2 |
| --- | --- | --- |
| Non-Productive | | |
| Solution SBR[1] | 100 | 100 |
| Carbon Black[2] | 90.0 | 90.0 |
| Aromatic Oil | 45 | 45 |
| Stearic Acid | 1.0 | 1.0 |
| Zinc Oxide | 1.25 | 3.0 |
| Antioxidant[3] | 0.7 | 0.7 |
| Coumarone Indene[4] Resin | 20 | 0 |
| Resin of Example 1 | 0 | 20 |
| Productive | | |
| Accelerators[5] | 2.5 | 2.5 |
| Accelerator[6] | 0.21 | 0.21 |
| Sulfur | 1.28 | 1.28 |

[1]Solution SBR containing 32 percent styrene, a vinyl content of 42 percent, a Tg of −16° C. and a base Mooney of 85–95. The solution SBR was obtained from The Goodyear Tire & Rubber Company.
[2]$I_2$ = 122 and DBP = 114
[3]Polymerized 1,2-dihydro-2,2,4-trimethylquinoline
[4]Coumarone Indene Resin having a softening point of 100° C. which is commercially available from Neville Chemical under the designature Cumar ™ R-13.
[5]N-cyclohexyl benzothiazole-2-sulfenamide
[6]Tetramethyl thiuram disulfide

TABLE II

| Samples | 1 | 2 |
| --- | --- | --- |
| Coumarone Indene Resin | 20 | 0 |
| Resin of Ex 1 | 0 | 20 |
| UTS, cured @ 28/150 | | |
| Modulus, 300% (Mpa) | 4.8 | 6 |
| Break Str (Mpa) | 11.4 | 11.4 |
| Elongation, % | 610 | 568 |
| HOT (100C) UTS, cured @ 28 min @ 150° C. | | |
| Modulus, 300% (Mpa) | 3.26 | 3.85 |
| Break Str (Mpa) | 7.2 | 7.85 |
| Elongation, % | 584 | 583 |
| Energy (N-cm) | 610 | 729 |
| RPA 2000 Cure: 160C, 1.677 Hz, 15.8 mins, 0.7% Strain | | |
| Min Torque | 0.66 | 0.75 |
| Max Torque | 3.35 | 4.07 |
| Delta Torque | 2.69 | 3.32 |
| T' 02 (min) | 0.52 | 0.178 |
| T' 25 (min) | 2.17 | 1.69 |
| T' 90 (min) | 8.43 | 8.27 |

TABLE II-continued

| Samples | 1 | 2 |
|---|---|---|
| Strain Sweep: 100C, 11 Hz | | |
| G' (kPa) at 40% Strain | 526 | 600 |
| Tan Delta at 40% Strain | 0.252 | 0.297 |
| J" (1/Mpa) at 40% Strain | 0.451 | 0.455 |

What is claimed is:

1. A pneumatic tire having a tread comprised of
(A) a rubber selected from the group consisting of natural rubber, rubber derived from a diene monomer or mixtures thereof, and
(B) a polymeric resin composition which is the reaction product of the polymerization reaction between dimethyl-dicyclopentadiene and limonene, said resin having a softening point ranging from about 50 to about 220° C., a molecular weight ranging from about 500 to about 42,000, and no less than 75 weight percent of the units in said resin are derived from dimethyl-dicyclopentadiene and limonene.

2. The pneumatic tire of claim 1 wherein said rubber derived from a diene monomer or mixtures thereof is selected from the group comprising natural rubber, polyisoprene, polybutadiene, polychloroprene, copolymers of isoprene and butadiene, copolymers of acrylonitrile and butadiene, copolymers of acrylonitrile and isoprene, copolymers of acrylonitrile and isoprene, copolymers of styrene and butadiene, copolymers of styrene and isoprene and blends thereof.

3. The pneumatic tire of claim 1 wherein said polymeric resin composition is present in an amount ranging from about 5 to about 50 parts per hundred parts of rubber.

4. The pneumatic tire of claim 3 wherein said polymeric resin composition is present in an amount ranging from about 10 to about 25 parts per hundred parts of rubber.

5. The pneumatic tire of claim 1 wherein said resin is the polymerization reaction product of from 10 to 1 parts by weight of dimethyl-dicyclopentadiene and from 1 to 10 parts by weight of limonene.

6. The pneumatic tire of claim 1 wherein said resin is the polymerization reaction product of from to 2 parts by weight of dimethyl-dicyclopentadiene and from 2 to 1 part by weight of limonene.

7. The pneumatic tire of claim 1 wherein said resin comprises from 5 to 95 weight percent of units derived from dimethyl-dicyclopentadiene and from 95 to 5 percent of units derived from limonene.

8. The pneumatic tire of claim 1 wherein said resin further contains up to 25 weight percent of units derived from hydrocarbons selected from the group consisting of $C_9$ and $C_{10}$ olefins.

* * * * *